United States Patent
Kawakubo et al.

(10) Patent No.: US 8,206,466 B2
(45) Date of Patent: Jun. 26, 2012

(54) METHOD FOR MANUFACTURING ELECTROLYTIC CAPACITOR

(75) Inventors: Tetsuya Kawakubo, Takeo (JP); Hironobu Nakao, Saga (JP)

(73) Assignees: SANYO Electric Co., Ltd., Moriguchi-shi, Osaka (JP); Saga Sanyo Industries Co., Ltd., Saga (JP)

( * ) Notice: Subject to any disclaimer, the term of this patent is extended or adjusted under 35 U.S.C. 154(b) by 0 days.

(21) Appl. No.: 12/946,922

(22) Filed: Nov. 16, 2010

(65) Prior Publication Data
US 2011/0119878 A1 May 26, 2011

(30) Foreign Application Priority Data
Nov. 24, 2009 (JP) .................................. 2009-266447

(51) Int. Cl.
*H01G 9/00* (2006.01)

(52) U.S. Cl. ........................................................ 29/25.03

(58) Field of Classification Search .................. None
See application file for complete search history.

(56) References Cited

U.S. PATENT DOCUMENTS
2008/0241705 A1* 10/2008 Wakita et al. ................. 429/344

FOREIGN PATENT DOCUMENTS
JP 2004-179621 A 6/2004

OTHER PUBLICATIONS
English Machine translation of JP 2004-179621 retrived Nov. 8, 2011.*

* cited by examiner

*Primary Examiner* — Seahvosh Nikmanesh
(74) *Attorney, Agent, or Firm* — Westerman, Hattori, Daniels & Adrian, LLP

(57) ABSTRACT

Electrode lead terminals in a number not less than three are attached to a cathode foil and an anode foil. The electrode lead terminals include at least one cathode lead terminal attached to the cathode foil and at least one anode lead terminal attached to the anode foil. A winding core having an axis is prepared. The cathode foil and the anode foil are wound around the winding core, being overlapped each other. A cross section of the winding core perpendicular to the axis includes an outer edge having a portion along each side of a polygon with the above number of sides. Thereby, a method for manufacturing an electrolytic capacitor capable of suppressing displacement of a lead terminal can be provided.

5 Claims, 18 Drawing Sheets

METHOD FOR MANUFACTURING ELECTROLYTIC CAPACITOR

This nonprovisional application is based on Japanese Patent Application No. 2009-266447 filed on Nov. 24, 2009 with the Japan Patent Office, the entire contents of which are hereby incorporated by reference.

BACKGROUND OF THE INVENTION

1. Field of the Invention

The present invention relates to a method for manufacturing an electrolytic capacitor, and in particular, to a method for manufacturing an electrolytic capacitor having an anode foil and a cathode foil that are wound.

2. Description of the Related Art

As one type of electrolytic capacitors, there is an electrolytic capacitor formed by winding an anode foil and a cathode foil each having a lead terminal attached thereto. Conventionally, as such a capacitor, electrolytic capacitors having one anode lead terminal and one cathode lead terminal, that is, electrolytic capacitors having a total of two lead terminals, have been widely used.

However, in recent years, there has been a demand for reduction of equivalent series inductance (ESL) and equivalent series resistance (ESR). Therefore, solid electrolytic capacitors having more than two terminals have also been used, as described for example in Japanese Patent Laying-Open No. 2004-179621.

SUMMARY OF THE INVENTION

Due to process variations caused when winding an anode foil and a cathode foil, an error may occur in arrangement of lead terminals. If more terminals are arranged as described above, it becomes more difficult to arrange lead terminals to comply with a standard.

The present invention has been made to solve the aforementioned problem, and one object of the present invention is to provide a method for manufacturing an electrolytic capacitor capable of suppressing displacement of a lead terminal.

A method for manufacturing an electrolytic capacitor in accordance with one aspect of the present invention has steps described below. A cathode foil and an anode foil are prepared. Electrode lead terminals in a number not less than three are attached to the cathode foil and the anode foil. The electrode lead terminals include at least one cathode lead terminal attached to the cathode foil and at least one anode lead terminal attached to the anode foil. A winding core having an axis is prepared. The cathode foil and the anode foil are wound around the winding core, being overlapped each other. A cross section of the winding core perpendicular to the axis includes an outer edge having a portion along each side of a polygon with the above number of sides.

A method for manufacturing an electrolytic capacitor in accordance with another aspect of the present invention has steps described below. A cathode foil and an anode foil are prepared. Electrode lead terminals in a number not less than three are attached to the cathode foil and the anode foil. The electrode lead terminals include at least one cathode lead terminal attached to the cathode foil and at least one anode lead terminal attached to the anode foil. A winding core having an axis is prepared. The cathode foil and the anode foil are wound around the winding core, being overlapped each other. A cross section of the winding core perpendicular to the axis has a substantially circular outer edge.

According to the method for manufacturing an electrolytic capacitor in accordance with one aspect of the present invention, a cross section of the winding core perpendicular to the axis includes an outer edge having a portion along each side of a polygon with the number of sides equal to the number of the electrode lead terminals. Thereby, the cathode foil and the anode foil can be wound around the winding core such that the electrode lead terminals in the above number are located on the above number of sides of the polygon, respectively. Therefore, each electrode lead terminal is located on a flat surface of the winding core at the time of winding, and thus displacement of each electrode lead terminal is suppressed.

According to the method for manufacturing an electrolytic capacitor in accordance with another aspect of the present invention, a cross section of the winding core perpendicular to the axis has a substantially circular outer edge. Thereby, the cathode foil, the anode foil, and the electrode lead terminals are arranged evenly around the axis of the winding core, and thus displacement of each electrode lead terminal is suppressed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, embodiments of the present invention will be described with reference to the drawings.

Embodiment 1

Figure 1:
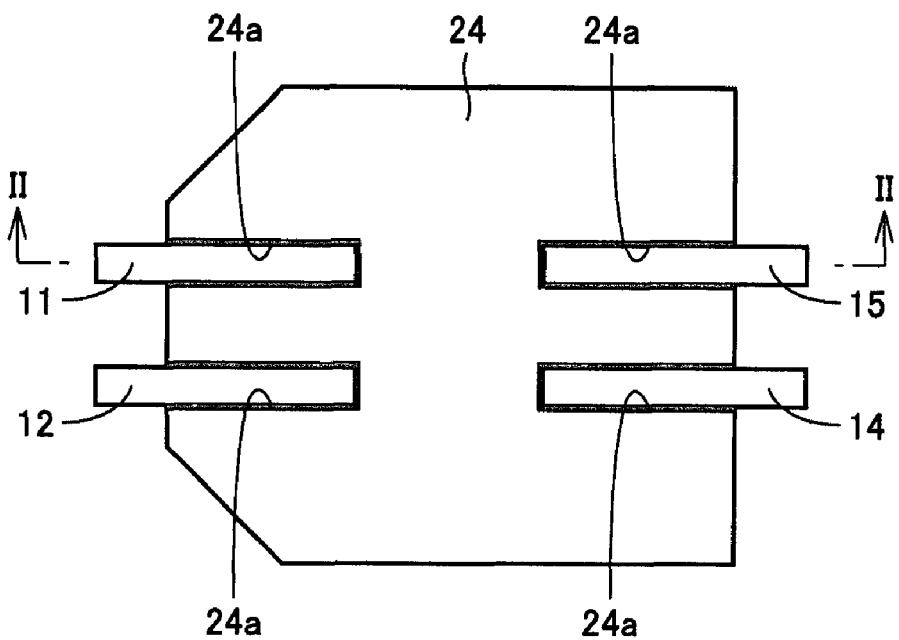
FIG. 1 is a plan view schematically showing a configuration of a solid electrolytic capacitor in Embodiment 1 of the present invention.
Figure 2:
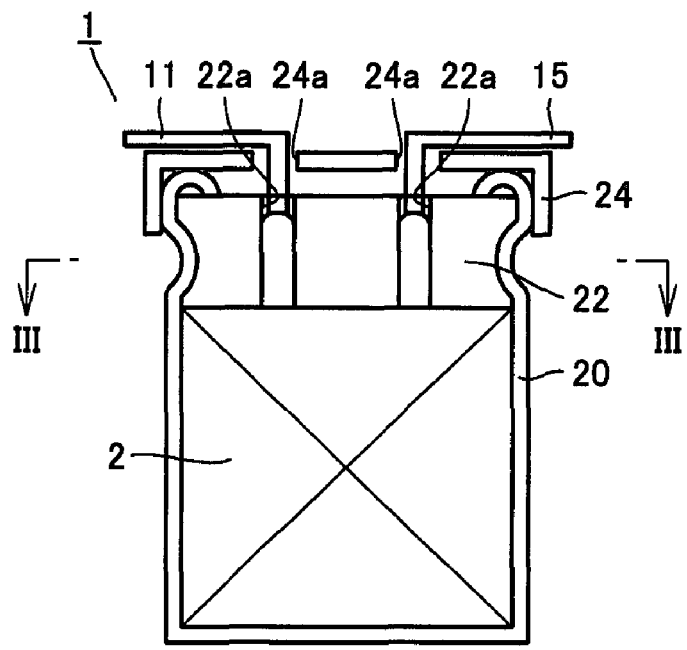
FIG. 2 is a schematic cross sectional view along a line II-II in FIG. 1.
Figure 3:
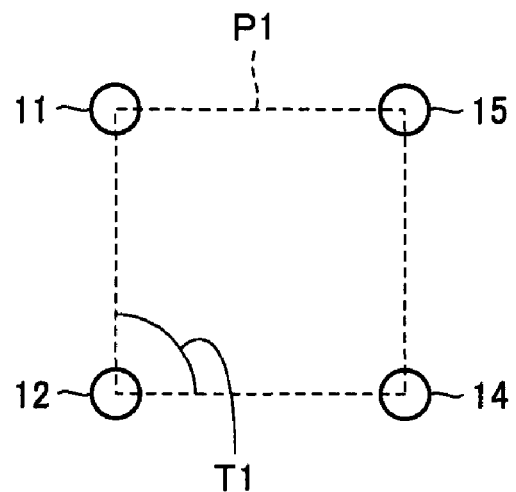
FIG. 3 is a view schematically showing arrangement of electrode lead terminals along a line III-III in FIG. 2.

Referring to FIGS. 1 to 3, a solid electrolytic capacitor of the present embodiment has a capacitor element 2, a seat plate 24, an aluminum case 20, a sealing rubber packing 22, and four electrode lead terminals.

The above four electrode lead terminals include first and second anode lead tab terminals (anode lead terminals) 11, 12, and first and second cathode lead tab terminals (cathode lead terminals) 14, 15. Further, these four terminals are attached to capacitor element 2 at positions corresponding to four apexes of a quadrangle P1 (FIG. 3). Preferably, an angle T1 of quadrangle P1 has an angle within 90°±20°, more preferably, quadrangle P1 is substantially a rectangle, and further more preferably, quadrangle P1 is substantially a square.

Next, a method for manufacturing the solid electrolytic capacitor of the present embodiment will be described.

Figure 4:
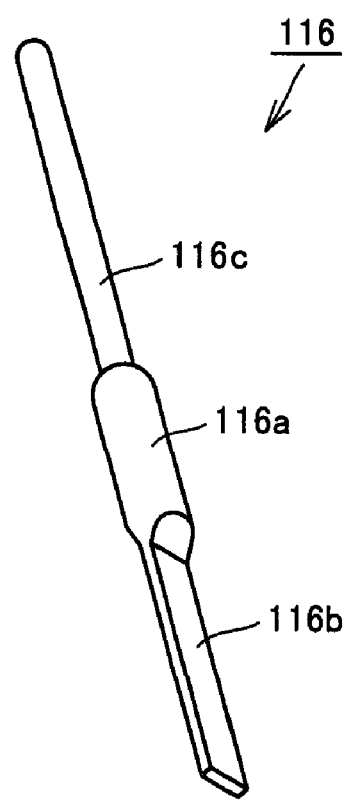
FIG. 4 is a perspective view schematically showing a first step of a method for manufacturing the solid electrolytic capacitor in Embodiment 1 of the present invention.

Referring to FIG. 4, a terminal 116 is prepared as each of the four electrode lead terminals described above. Terminal 116 has a boss portion 116a, a connection portion 116b, and a lead portion 116c.

Figure 5:
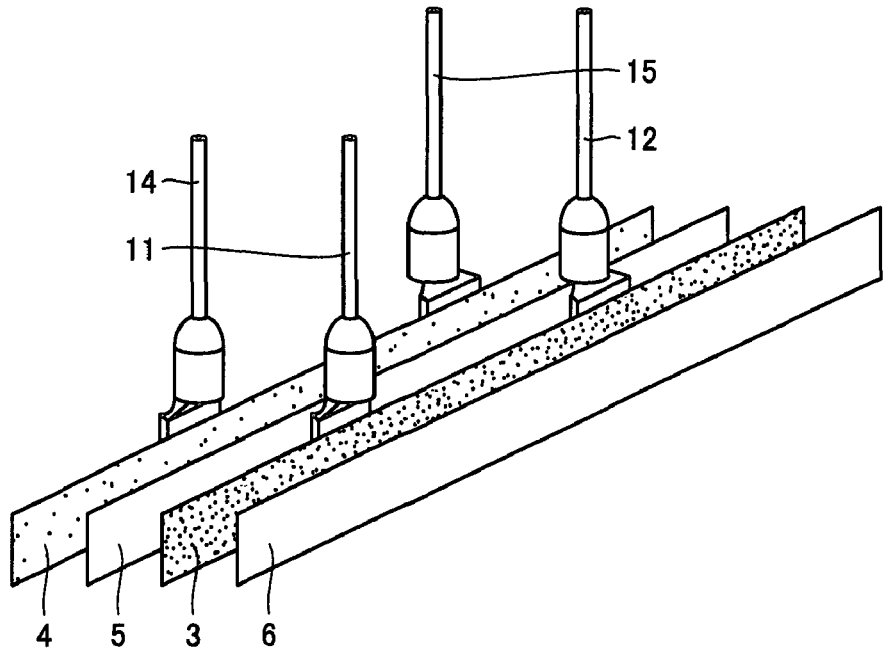
FIG. 5 is a perspective view schematically showing a second step of the method for manufacturing the solid electrolytic capacitor in Embodiment 1 of the present invention.

Further, referring to FIG. 5, an anode foil 3, a cathode foil 4, and separator sheets 5, 6 are prepared. Then, the first and second anode lead tab terminals 11,12 are attached to anode foil 3 at predetermined two positions in a longitudinal direction. Specifically, connection portion 116b (FIG. 4) of each of the first and second anode lead tab terminals 11,12 is connected to anode foil 3. In addition, the first and second cathode lead tab terminals 14, 15 are attached to cathode foil 4 at predetermined two positions in the longitudinal direction. Specifically, connection portion 116b (FIG. 4) of each of the first and second cathode lead tab terminals 14, 15 is connected to cathode foil 4. The predetermined positions described above are determined such that the terminals are arranged as shown in FIG. 3 when anode foil 3 and cathode foil 4 are wound as described later.

Next, anode foil 3 and cathode foil 4 are overlapped each other, with separator sheet 5 interposed therebetween. In addition, separator sheet 6 is overlapped on anode foil 3.

Figure 6:
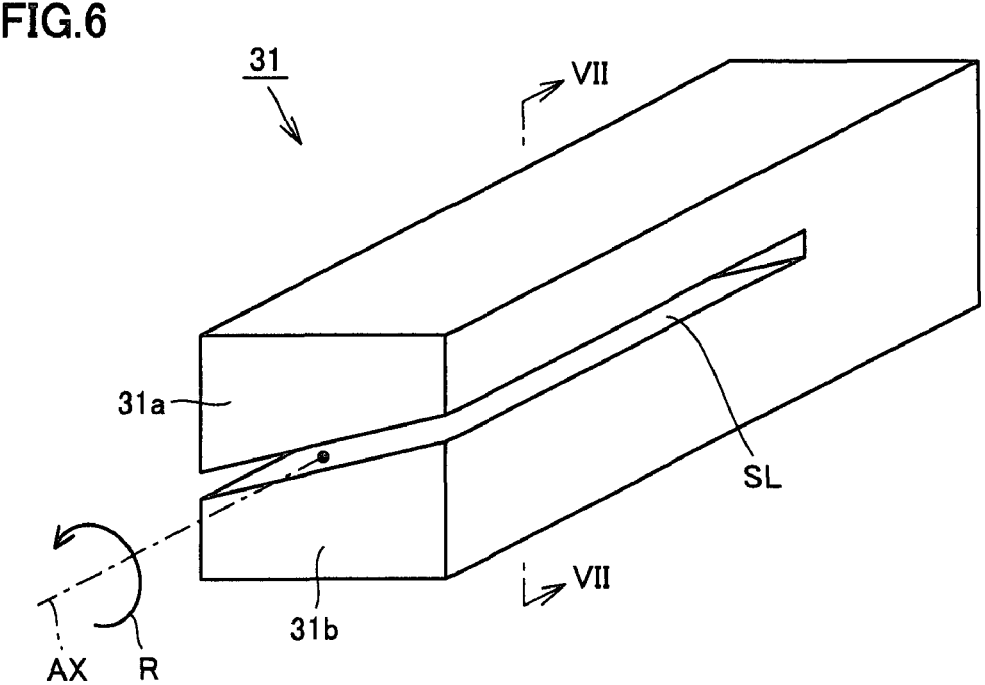
FIG. 6 is a perspective view schematically showing a third step of the method for manufacturing the solid electrolytic capacitor in Embodiment 1 of the present invention.
Figure 7:
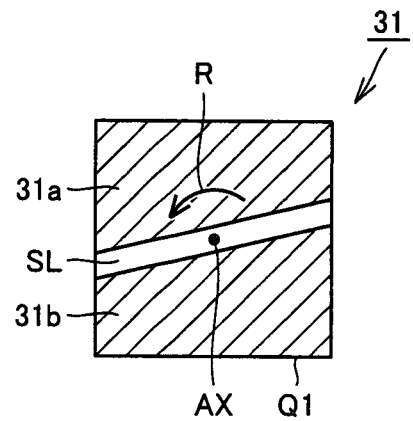
FIG. 7 is a schematic cross sectional view along a line VII-VII in FIG. 6.

Referring to FIGS. 6 and 7, a winding core 31 having an axis AX is prepared. One end portion of winding core 31 in a direction of axis AX is divided by a slit SL into first and second portions 31a, 31b. Further, a cross section of winding core 31 perpendicular to axis AX has an outer edge substantially corresponding to a quadrangle Q1 as shown in FIG. 7. Preferably, quadrangle Q1 is substantially a square. Preferably, corner portions of quadrangle Q1 are chamfered so as not to damage the foils. It is to be noted that the cross section of winding core 31 referred to herein is a cross section without consideration of the presence of the chamfers described above and slit SL.

Figure 8:
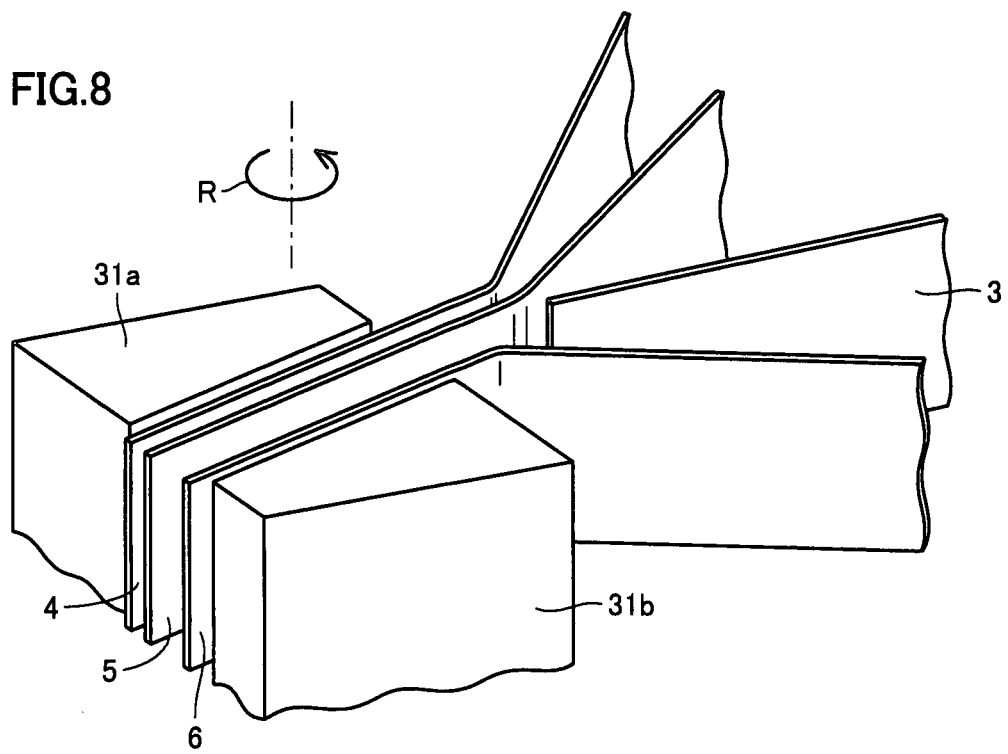
FIG. 8 is a perspective view schematically showing a fourth step of the method for manufacturing the solid electrolytic capacitor in Embodiment 1 of the present invention.

Referring to FIG. 8, one end portions of anode foil 3, cathode foil 4, and separator sheets 5, 6 are tucked into slit SL. Then, winding core 31 is rotated about axis AX as indicated by an arrow R in FIGS. 6 to 8. Thereby, separator sheet 6, anode foil 3, separator sheet 5, and cathode foil 4 are wound about winding core 31, being overlapped each other.

Figure 9:
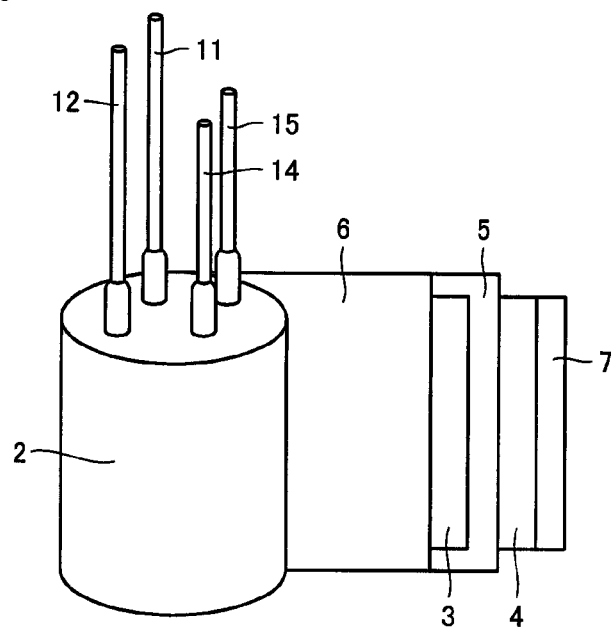
FIG. 9 is a perspective view schematically showing a fifth step of the method for manufacturing the solid electrolytic capacitor in Embodiment 1 of the present invention.

Referring to FIG. 9, capacitor element 2 is formed as a result of the winding described above. The other end portion of cathode foil 4 is secured with a winding stop tape 7.

Subsequently, chemical conversion treatment is performed, and then heat treatment at a temperature of about 150° C. to 300° C. is performed, on capacitor element 2 at a cut surface of the anode foil and the like. Next, capacitor element 2 is impregnated with a mixed solution of, for example, 3,4-ethylenedioxythiophene as a monomer that will be a conductive polymer by polymerization, and, for example, a ferric p-toluenesulfonic acid alcohol solution as an oxidant solution. Thereafter, as a result of thermochemical polymerization, a conductive polymer layer (not shown) is formed between an anode and a cathode of capacitor element 2. As an electrolyte, for example, a conductive polymer material such as polypyrrole, polyfuran, or polyaniline, or a TCNQ complex salt (7,7,8,8-tetracyanoquinodimethane) may be used instead.

Figure 10:
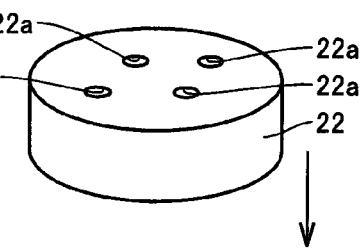
FIG. 10 is a perspective view schematically showing a sixth step of the method for manufacturing the solid electrolytic capacitor in Embodiment 1 of the present invention.
Figure 10:
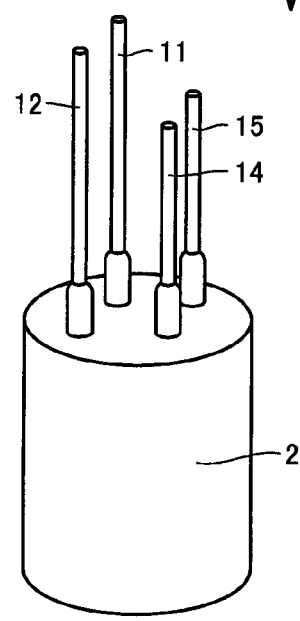

Referring to FIG. 10, sealing rubber packing 22 is prepared. Openings 22a are formed in sealing rubber packing 22 at positions corresponding to the first and second anode lead tab terminals 11,12 and the first and second cathode lead tab terminals 14, 15. Then, as indicated by an arrow in FIG. 10, the first and second anode lead tab terminals 11,12 and the first and second cathode lead tab terminals 14, 15 of capacitor element 2 are passed through four openings 22a in sealing rubber packing 22, respectively.

Figure 11:
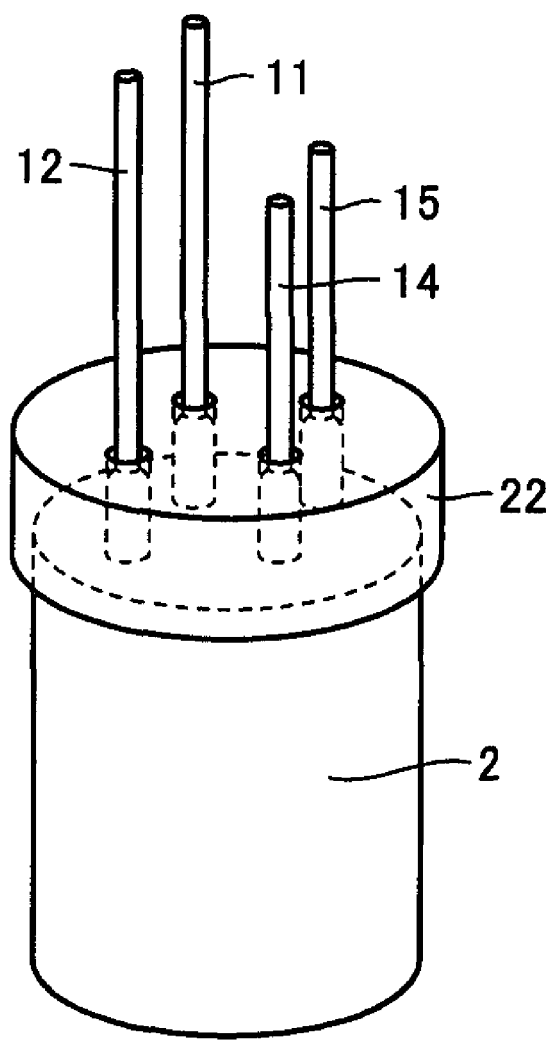
FIG. 11 is a perspective view schematically showing a seventh step of the method for manufacturing the solid electrolytic capacitor in Embodiment 1 of the present invention.

Referring to FIG. 11, capacitor element 2 mounted with sealing rubber packing 22 is thus formed.

Referring mainly to FIGS. 1 and 2, capacitor element 2 mounted with sealing rubber packing 22 is housed in bottomed aluminum case 20 of a predetermined size. Then, an opening end side of aluminum case 20 is sealed by pressing in a lateral direction and curling, and predetermined aging treatment is performed. Subsequently, plastic seat plate 24 is attached to a curled surface of aluminum case 20. Four openings 24a corresponding to the positions of lead tab terminals 11, 12, 14, and 15 are formed in seat plate 24. Further, seat plate 24 is mounted to capacitor element 2 by causing lead portions 116c (FIG. 4) of lead tab terminals 11, 12, 14, and 15 to pass through corresponding openings 24a. Next, pressing and bending are performed on lead portions 116c (FIG. 4) projecting from openings 24a in seat plate 24. Thereby, an electrolytic capacitor 1 of a four-terminal structure is completed.

Figure 12:
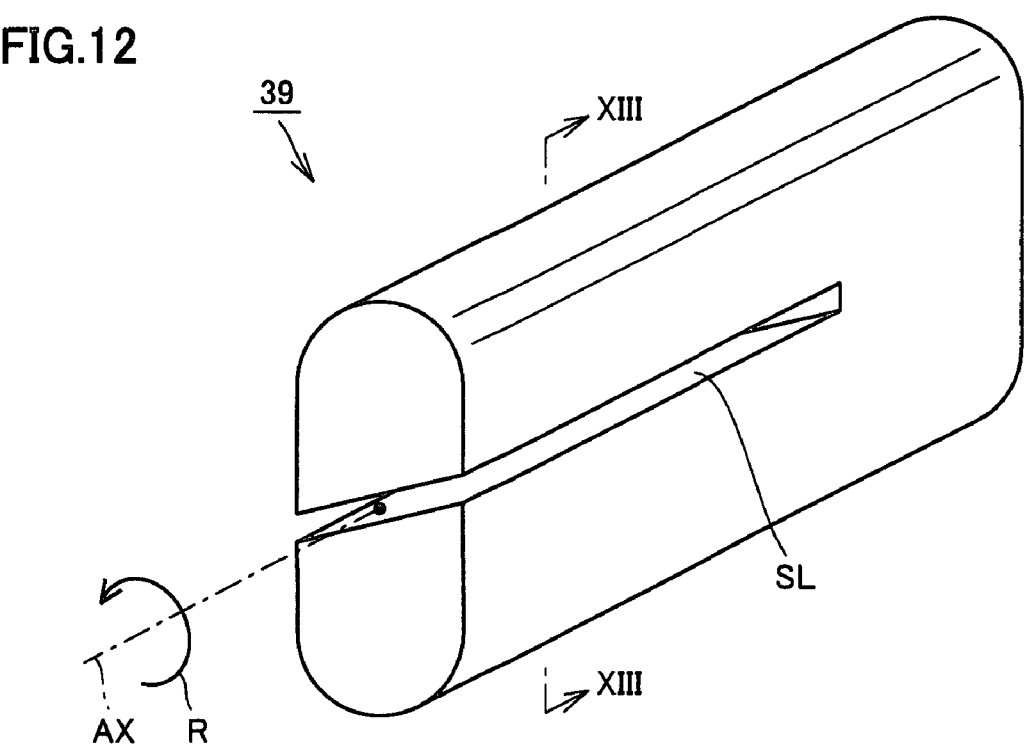
FIG. 12 is a perspective view showing a winding core of a solid electrolytic capacitor of a comparative example.
Figure 13:
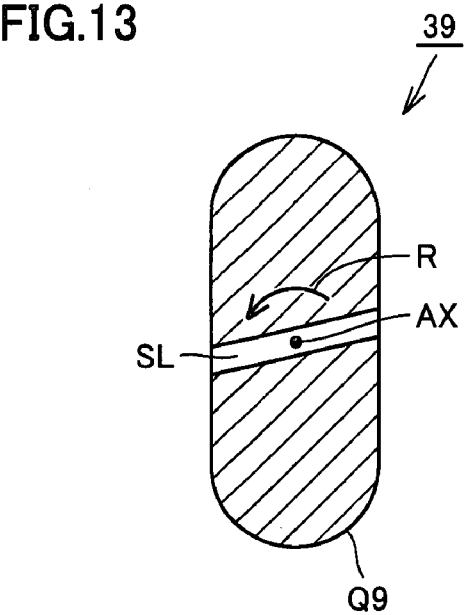
FIG. 13 is a cross sectional view along a line XIII-XIII in FIG. 12.

According to the method for manufacturing the solid electrolytic capacitor of the present embodiment, accuracy of the arrangement of four lead tab terminals 11, 12, 14, and 15 can be improved. In order to verify the effect, accuracy of the positions of the lead terminals was compared and examined between an example using winding core 31 having a square outer edge and a comparative example using a winding core 39 (FIG. 12) having an outer edge of a track shape Q9 (FIG. 13). Herein, the track shape refers to a shape formed by a combination of a pair of straight portions opposed and parallel to each other and a pair of semicircular portions opposed to each other and projecting outward. Specifically, 300 solid electrolytic capacitors were manufactured, and checked as to whether or not they satisfied a standard that angle T1 of quadrangle P1 (FIG. 3) having apexes located at the positions of lead tab terminals 11, 12, 14, and 15 has an angle within 90°±20°. As a result, all of the 300 solid electrolytic capacitors of the example were within the standard, although all of the 300 solid electrolytic capacitors of the comparative example were out of the standard. Namely, accuracy of the arrangement of the lead tab terminals in the example was higher than that in the comparative example.

Figure 14:
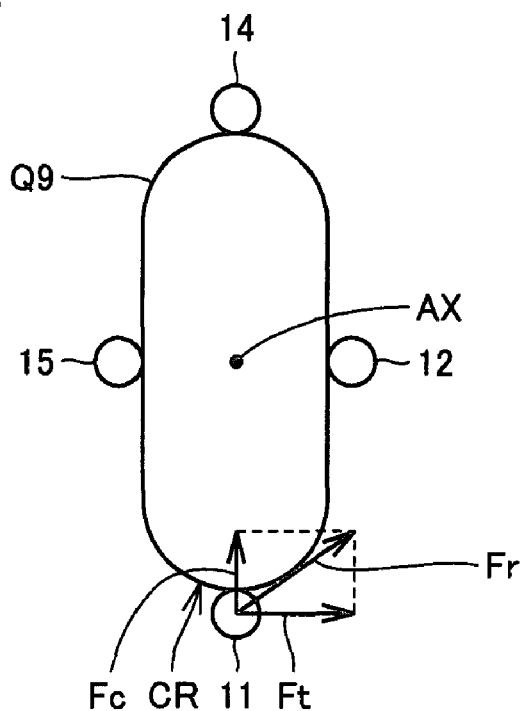
FIG. 14 is an explanatory view schematically showing a state of a force applied to an electrode lead in a method for manufacturing the solid electrolytic capacitor of the comparative example.

Referring mainly to FIG. 14, a presumed reason for reduced accuracy of the arrangement of the lead tab terminals in the comparative example will be described. When anode foil 3, cathode foil 4, and separator sheets 5, 6 are wound about winding core 39, a force directed to axis AX of winding core 39 is applied to each of lead tab terminals 11, 12, 14, and 15. For example, a force Fc directed to axis AX is applied to the first anode lead tab terminal 11. Force Fc is a force that presses the first anode lead tab terminal 11 against winding core 39, and it is conceived that the first anode lead tab terminal 11 will not be displaced by force Fc alone. However, a force along the outer edge of winding core 31 may be applied to each of lead tab terminals 11, 12, 14, and 15 due to variations in tension in anode foil 3 or cathode foil 4. For example, a force Ft (FIG. 14) may be applied to the first anode lead tab terminal 11 due to variations in tension in anode foil 3. As a result, a resultant force Fr of force Fc and force Ft is applied to the first anode lead tab terminal 11. Winding core 39 has a curved portion CR as it has the outer edge of track shape Q9, and the first anode lead tab terminal 11 located on a curved surface of winding core 39 corresponding to curved portion CR is likely to be displaced under resultant force Fr. This is considered as a reason for reduced accuracy of the arrangement of the lead tab terminals in the comparative example.

Figure 15:
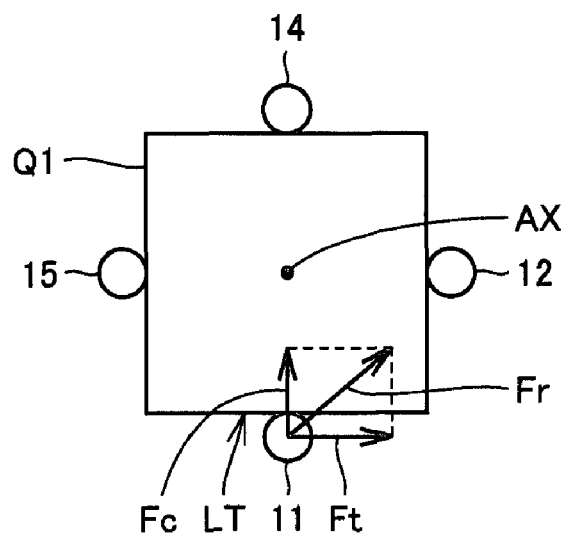
FIG. 15 is an explanatory view schematically showing a state of a force applied to an electrode lead in the method for manufacturing the solid electrolytic capacitor in Embodiment 1 of the present invention.

Referring mainly to FIG. 15, in contrast, winding core 31 of the example has a straight portion LT as it has the outer edge in the shape of quadrangle Q1, and the first anode lead tab terminal 11 located on a flat surface of winding core 31 corresponding to straight portion LT is stable even under resultant force Fr. This is considered as a reason for improved accuracy of the arrangement of the lead tab terminals in the example using winding core 31. Similarly, other three lead tab terminals 12, 14, and 15 are also less likely to be displaced as they are arranged on other three sides of quadrangle Q1, respectively. It is conceived that accuracy of the arrangement of all the four lead tab terminals 11, 12, 14, and 15 is thereby improved.

Figure 16:
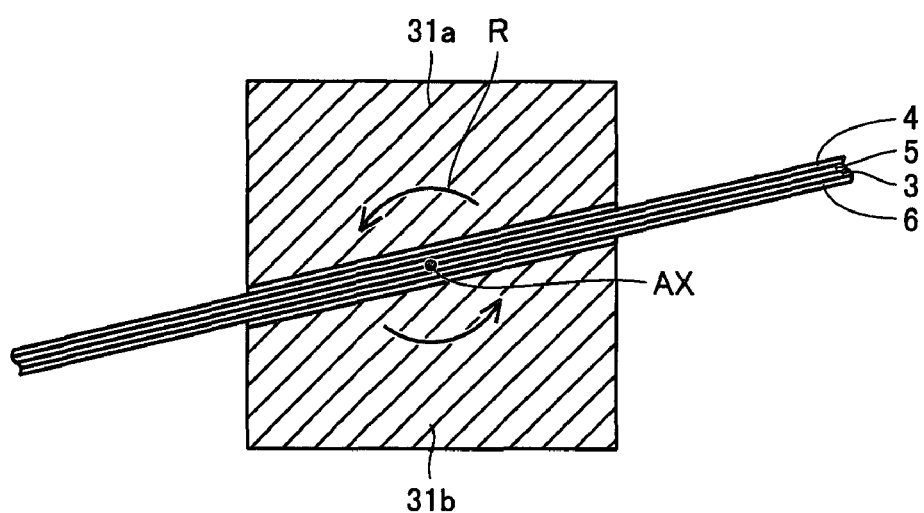
FIG. 16 is a cross sectional view schematically showing one step of a method for manufacturing a solid electrolytic capacitor in a variation of Embodiment 1 of the present invention.

Although one end portions of anode foil 3, cathode foil 4, and separator sheets 5, 6 are tucked into slit SL as shown in FIG. 8 in the present embodiment, middle portions of anode foil 3, cathode foil 4, and separator sheets 5, 6 may be tucked into slit SL as shown in FIG. 16. In this case, winding is started at each of both ends of slit SL.

Embodiment 2

Figure 17:
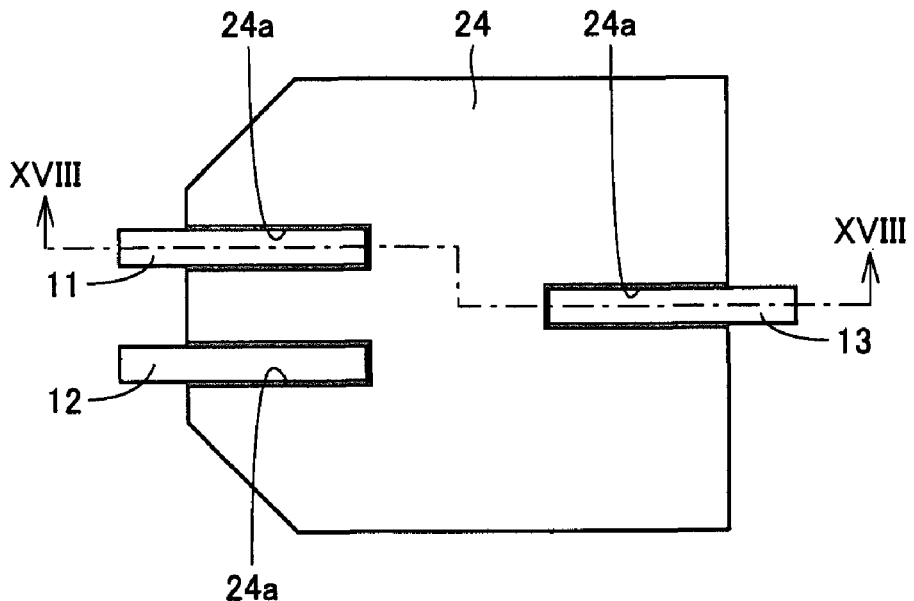
FIG. 17 is a plan view schematically showing a configuration of a solid electrolytic capacitor in Embodiment 2 of the present invention.
Figure 18:
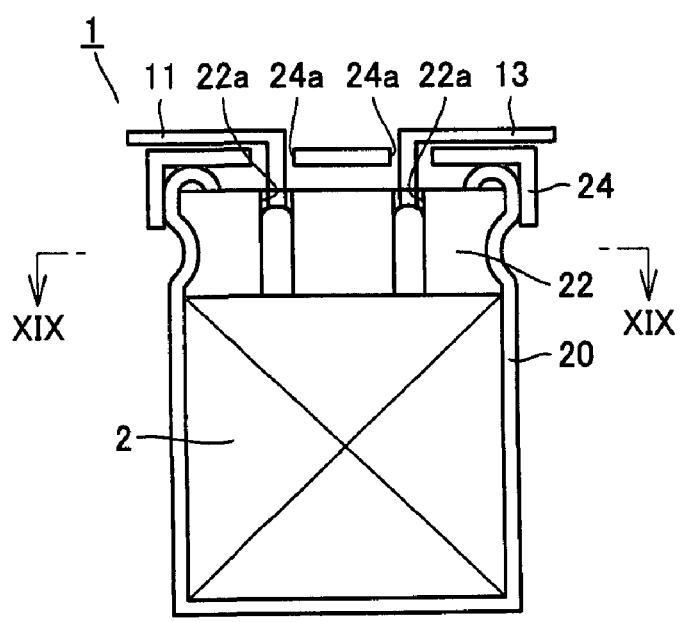
FIG. 18 is a schematic cross sectional view along a line XVIII-XVIII in FIG. 17.
Figure 19:
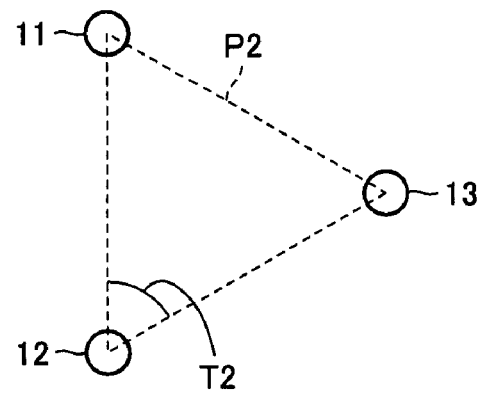
FIG. 19 is a view schematically showing arrangement of electrode lead terminals along a line XIX-XIX in FIG. 18.

Referring to FIGS. 17 to 19, a solid electrolytic capacitor of the present embodiment has three electrode lead terminals. These three electrode lead terminals include first and second anode lead tab terminals (anode lead terminals) 11, 12, and a cathode lead tab terminal (cathode lead terminal) 13. Further, these three terminals are attached to capacitor element 2 at positions corresponding to three apexes of a triangle P2 (FIG. 19). Preferably, an angle T2 of triangle P2 has an angle within 60°±20°, and more preferably, triangle P2 is substantially an equilateral triangle.

Since the configuration of the present embodiment is substantially identical to the configuration of Embodiment 1 described above in respects other than those described above, identical or corresponding parts will be designated by the same reference numerals, and the description thereof will not be repeated.

Next, a method for manufacturing the solid electrolytic capacitor of the present embodiment will be described.

Referring to FIG. 4, terminal 116 is prepared as each of electrode lead terminals 11 to 13, as in Embodiment 1.

Figure 20:
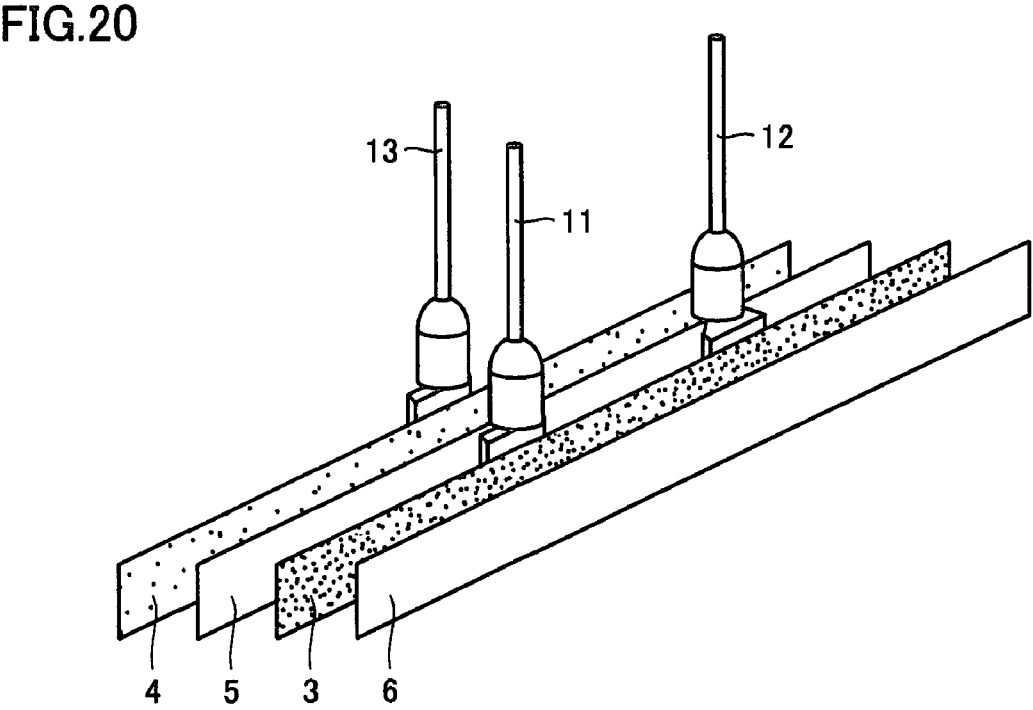
FIG. 20 is a perspective view schematically showing a first step of a method for manufacturing the solid electrolytic capacitor in Embodiment 2 of the present invention.

Referring to FIG. 20, anode foil 3, cathode foil 4, and separator sheets 5, 6 are prepared. Then, the first and second anode lead tab terminals 11,12 are attached to anode foil 3 at predetermined two positions in the longitudinal direction. Specifically, connection portion 116b (FIG. 4) of each of the first and second anode lead tab terminals 11,12 is connected to anode foil 3. In addition, cathode lead tab terminal 13 is attached to cathode foil 4 at a predetermined position in the longitudinal direction. Specifically, connection portion 116b (FIG. 4) of cathode lead tab terminal 13 is connected to cathode foil 4. The predetermined positions described above are determined such that the terminals are arranged as shown in FIG. 19 when anode foil 3 and cathode foil 4 are wound as described later.

Next, anode foil 3 and cathode foil 4 are overlapped each other, with separator sheet 5 interposed therebetween. In addition, separator sheet 6 is overlapped on anode foil 3.

Figure 21:
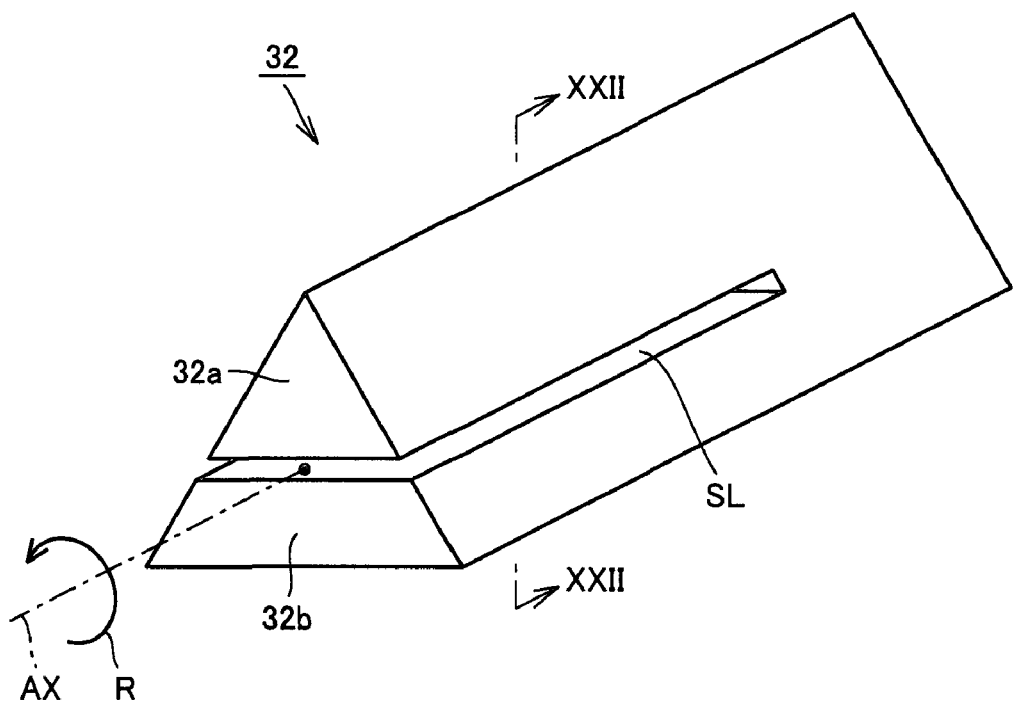
FIG. 21 is a perspective view schematically showing a second step of the method for manufacturing the solid electrolytic capacitor in Embodiment 2 of the present invention.
Figure 22:
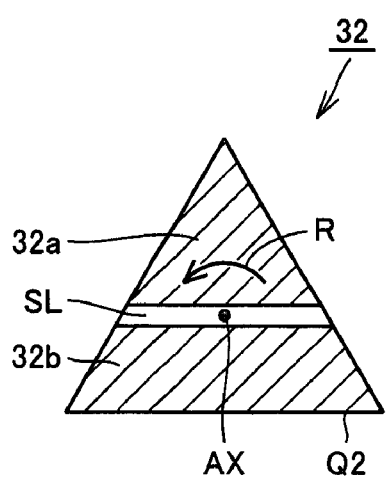
FIG. 22 is a schematic cross sectional view along a line XXII-XXII in FIG. 21.

Referring to FIGS. 21 and 22, a winding core 32 having axis AX is prepared. One end portion of winding core 32 in the direction of axis AX is divided by slit SL into first and second portions 32a, 32b. Further, a cross section of winding core 32 perpendicular to axis AX has an outer edge substantially corresponding to a triangle Q2 as shown in FIG. 22. Preferably, triangle Q2 is substantially an equilateral triangle. Preferably, corner portions of triangle Q2 are chamfered so as not to damage wound objects. It is to be noted that the cross section of winding core 32 referred to herein is a cross section without consideration of the presence of the chamfers described above and slit SL.

Figure 23:
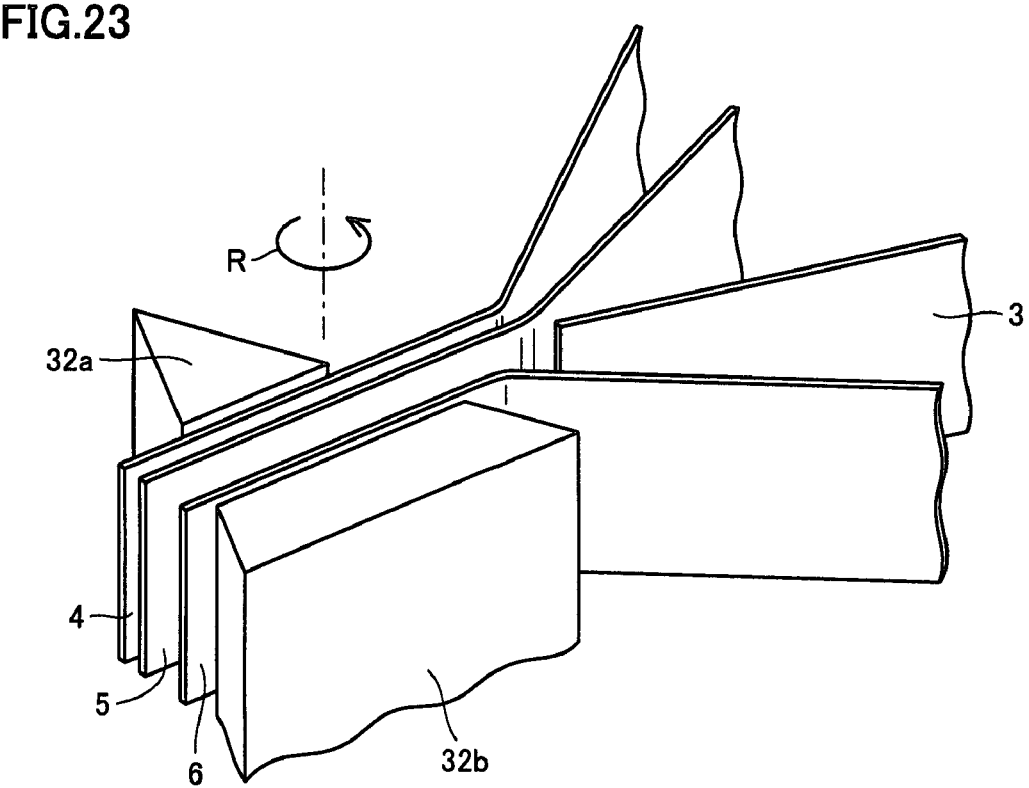
FIG. 23 is a perspective view schematically showing a third step of the method for manufacturing the solid electrolytic capacitor in Embodiment 2 of the present invention.

Referring to FIG. 23, one end portions of anode foil 3, cathode foil 4, and separator sheets 5, 6 are tucked into slit SL. Then, winding core 32 is rotated about axis AX as indicated by arrow R in FIGS. 21 to 23. Thereby, separator sheet 6, anode foil 3, separator sheet 5, and cathode foil 4 are wound about winding core 32, being overlapped each other.

Figure 24:
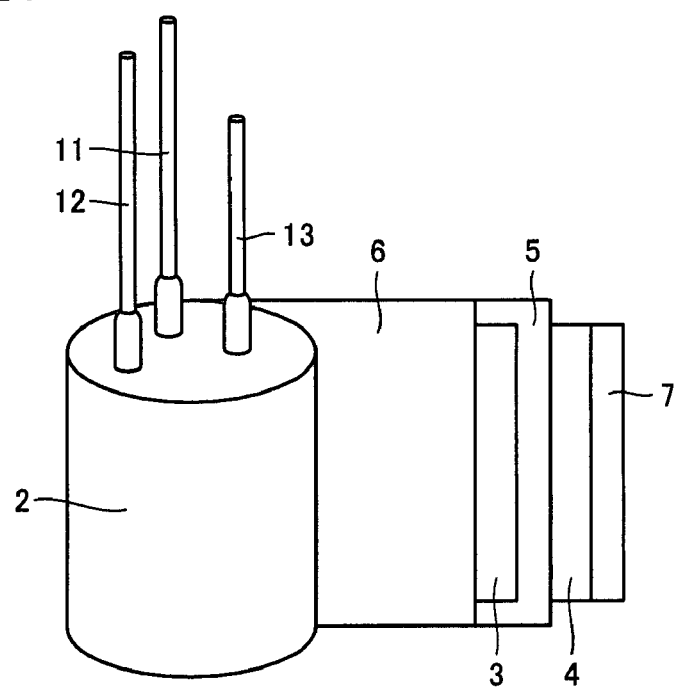
FIG. 24 is a perspective view schematically showing a fourth step of the method for manufacturing the solid electrolytic capacitor in Embodiment 2 of the present invention.

Referring to FIG. 24, capacitor element 2 is formed as a result of the winding described above. The other end portion of cathode foil 4 is secured with winding stop tape 7. Subsequently, an electrolyte is formed for capacitor element 2 as in Embodiment 1.

Figure 25:
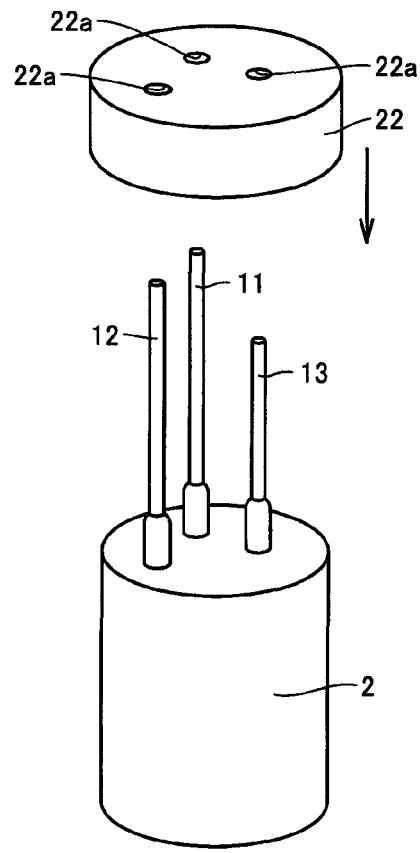
FIG. 25 is a perspective view schematically showing a fifth step of the method for manufacturing the solid electrolytic capacitor in Embodiment 2 of the present invention.

Referring to FIG. 25, sealing rubber packing 22 is prepared. Openings 22a are formed in sealing rubber packing 22 at positions corresponding to the first and second anode lead tab terminals 11,12 and cathode lead tab terminal 13. Then, as indicated by an arrow in FIG. 25, the first and second anode lead tab terminals 11,12 and cathode lead tab terminal 13 of capacitor element 2 are passed through three openings 22a in sealing rubber packing 22, respectively.

Figure 26:
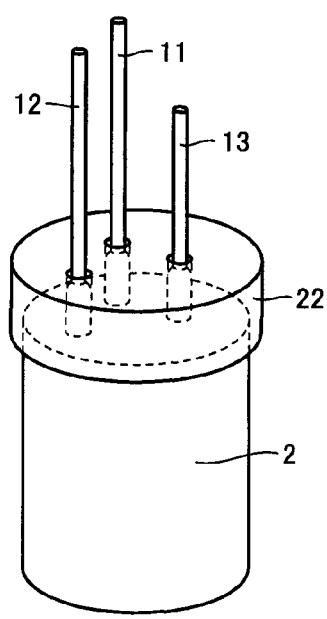
FIG. 26 is a perspective view schematically showing a sixth step of the method for manufacturing the solid electrolytic capacitor in Embodiment 2 of the present invention.

Referring to FIG. 26, capacitor element 2 mounted with sealing rubber packing 22 is thus formed.

Referring mainly to FIGS. 17 and 18, capacitor element 2 mounted with sealing rubber packing 22 is housed in bottomed aluminum case 20 of a predetermined size.

Then, an opening end side of aluminum case 20 is sealed by pressing in a lateral direction and curling, and predetermined aging treatment is performed. Subsequently, plastic seat plate 24 is attached to a curled surface of aluminum case 20. Three openings 24a corresponding to the positions of lead tab terminals 11 to 13 are formed in seat plate 24. Further, seat plate 24 is mounted to capacitor element 2 by causing lead portions 116c (FIG. 4) of lead tab terminals 11 to 13 to pass through corresponding openings 24a. Next, pressing and bending are performed on lead portions 116c (FIG. 4) projecting from openings 24a in seat plate 24. Thereby, electrolytic capacitor 1 of a three-terminal structure is completed.

According to the method for manufacturing the solid electrolytic capacitor of the present embodiment, accuracy of the arrangement of three lead tab terminals 11 to 13 can be improved. In order to verify the effect, accuracy of the positions of the lead terminals was compared and examined between an example using winding core 32 having an outer edge in the shape of an equilateral triangle and the comparative example using winding core 39 (FIG. 12) having the outer edge of track shape Q9 (FIG. 13). Specifically, 300 solid electrolytic capacitors were manufactured, and checked as to whether or not they satisfied a standard that angle T2 of triangle P2 (FIG. 19) having apexes located at the positions of lead tab terminals 11 to 13 has an angle of 60°±20°. As a result, all of the 300 solid electrolytic capacitors of the example were within the standard, although all of the 300 solid electrolytic capacitors of the comparative example were out of the standard. Namely, accuracy of the arrangement of the lead tab terminals in the example was higher than that in the comparative example.

Figure 27:
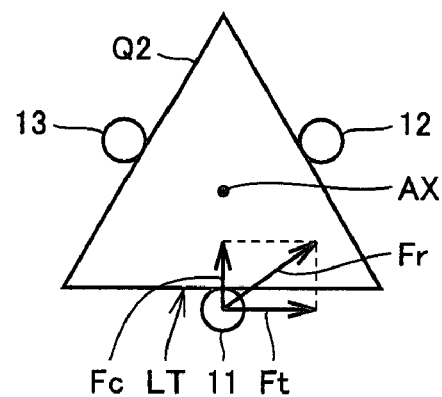
FIG. 27 is an explanatory view schematically showing a state of a force applied to an electrode lead in the method for manufacturing the solid electrolytic capacitor in Embodiment 2 of the present invention.

Referring mainly to FIG. 27, winding core 32 of the example has straight portion LT as it has the outer edge in the shape of triangle Q2, and the first anode lead tab terminal 11 located on a flat surface of winding core 32 corresponding to straight portion LT is stable even under resultant force Fr. This is considered as a reason for improved accuracy of the arrangement of the lead tab terminals in the example using winding core 32. Similarly, other two lead tab terminals 12 and 13 are also less likely to be displaced as they are arranged on other two sides of triangle Q2, respectively. It is conceived that accuracy of the arrangement of all the three lead tab terminals 11 to 13 is thereby improved.

Figure 28:
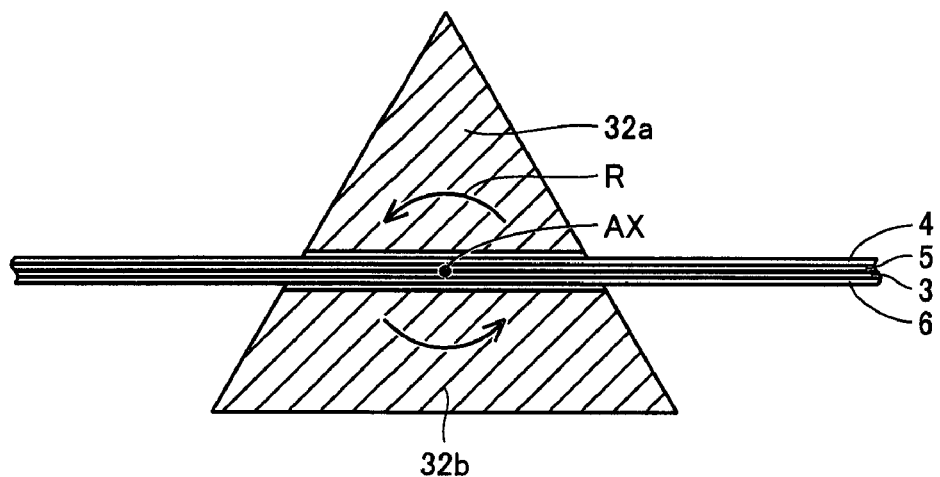
FIG. 28 is a cross sectional view schematically showing one step of a method for manufacturing a solid electrolytic capacitor in a variation of Embodiment 2 of the present invention.

Although one end portions of anode foil 3, cathode foil 4, and separator sheets 5, 6 are tucked into slit SL as shown in FIG. 23 in the present embodiment, middle portions of anode foil 3, cathode foil 4, and separator sheets 5, 6 may be tucked into slit SL as shown in FIG. 28. In this case, winding is started at each of both ends of slit SL.

Embodiment 3

In Embodiment 1, winding core 31 (FIGS. 6, 7) having an outer edge in the shape of substantially quadrangle Q1 is used.

Figure 29:
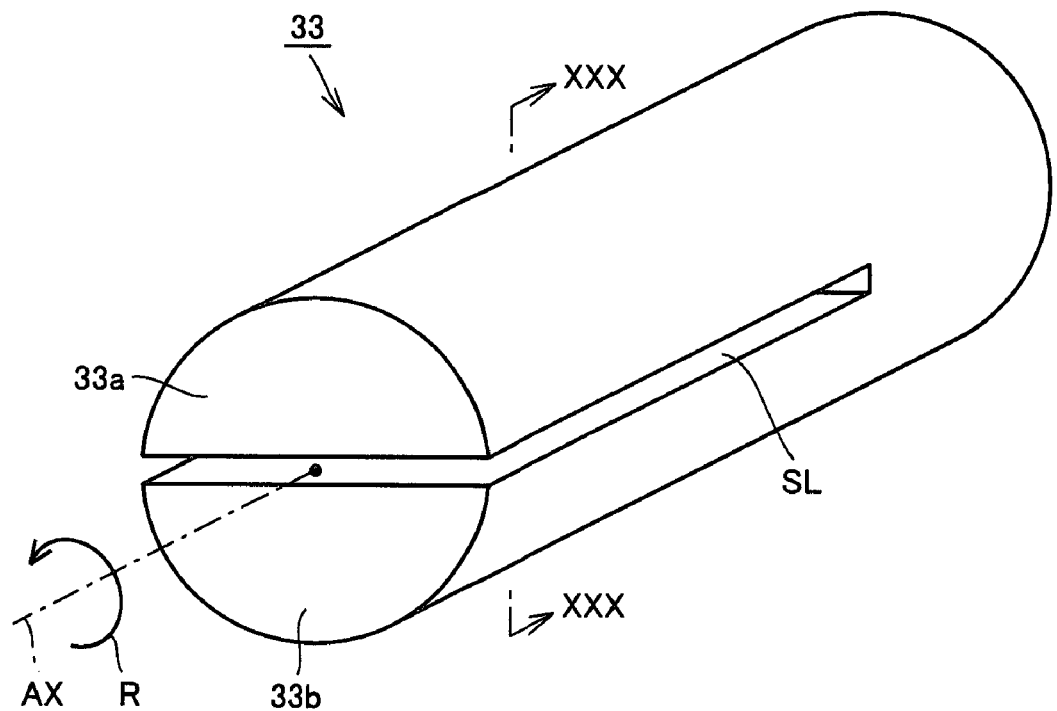
FIG. 29 is a perspective view schematically showing a first step of a method for manufacturing a solid electrolytic capacitor in Embodiment 3 of the present invention.
Figure 30:
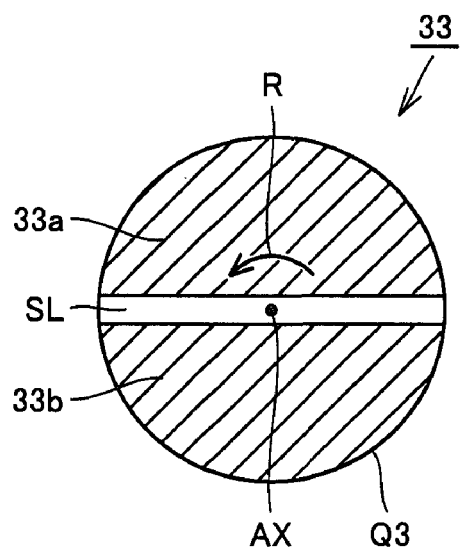
FIG. 30 is a schematic cross sectional view along a line XXX-XXX in FIG. 29.

Referring to FIGS. 29 and 30, in the present embodiment, a winding core 33 is prepared instead. One end portion of winding core 33 in the direction of axis AX is divided by slit SL into first and second portions 33a, 33b. Further, a cross section of winding core 33 perpendicular to axis AX has an outer edge substantially corresponding to a circle Q3 as shown in FIG. 30. It is to be noted that the cross section of winding core 33 referred to herein is a cross section without consideration of the presence of slit SL.

Figure 31:
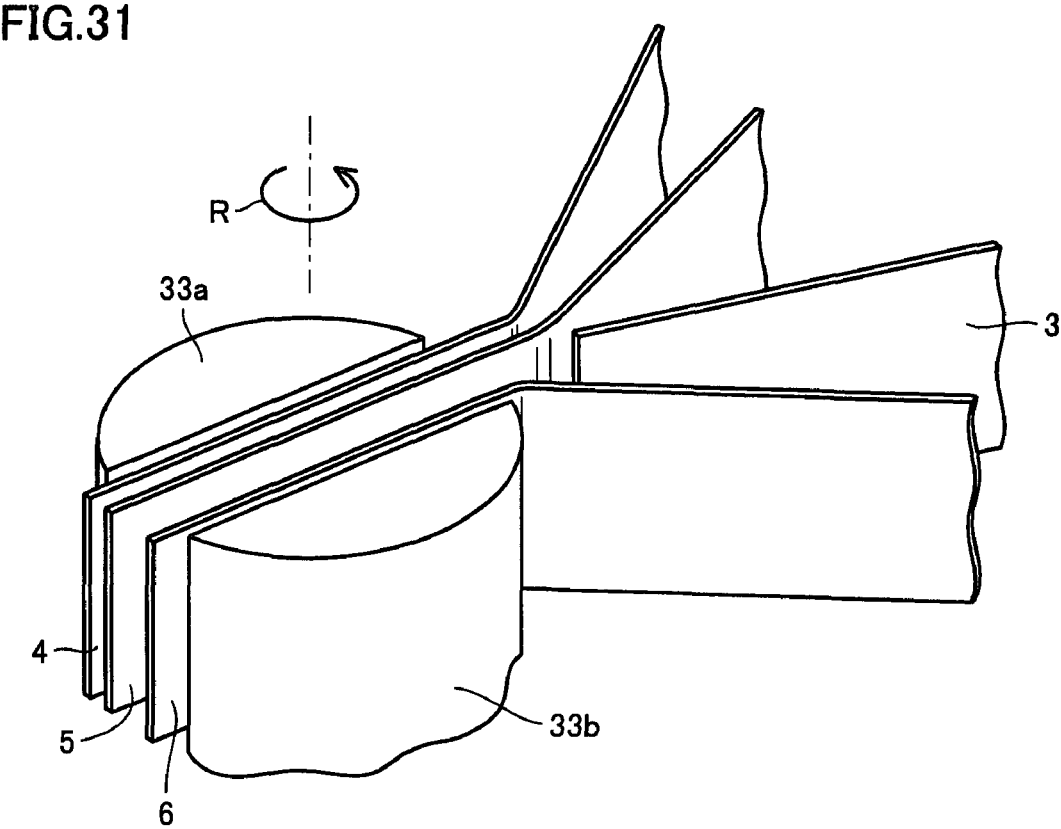
FIG. 31 is a perspective view schematically showing a second step of the method for manufacturing a solid electrolytic capacitor in Embodiment 3 of the present invention.

Referring to FIG. 31, one end portions of anode foil 3, cathode foil 4, and separator sheets 5, 6 are tucked into slit SL. Then, winding core 33 is rotated about axis AX as indicated by arrow R in FIGS. 29 to 31. Thereby, separator sheet 6, anode foil 3, separator sheet 5, and cathode foil 4 are wound about winding core 33, being overlapped each other. Thereafter, through the same steps as those in Embodiment 1, electrolytic capacitor 1 of a four-terminal structure (FIGS. 1, 2) is completed.

According to the method for manufacturing a solid electrolytic capacitor of the present embodiment, accuracy of the arrangement of four lead tab terminals 11, 12, 14, and 15 can be improved. In order to verify the effect, accuracy of the positions of the lead terminals was compared and examined between an example using winding core 33 having a circular outer edge and the comparative example using winding core 39 (FIG. 12) having the outer edge of track shape Q9 (FIG. 13). Specifically, 300 solid electrolytic capacitors were manufactured, and checked as to whether or not they satisfied a standard that angle T1 of quadrangle P1 (FIG. 3) having apexes located at the positions of lead tab terminals 11, 12, 14, and 15 has an angle within 90°±20°. As a result, 15 of the 300 solid electrolytic capacitors of the example were out of the standard, although all of the 300 solid electrolytic capacitors of the comparative example were out of the standard. Namely, accuracy of the arrangement of the lead tab terminals in the example was higher than that in the comparative example.

Figure 32:
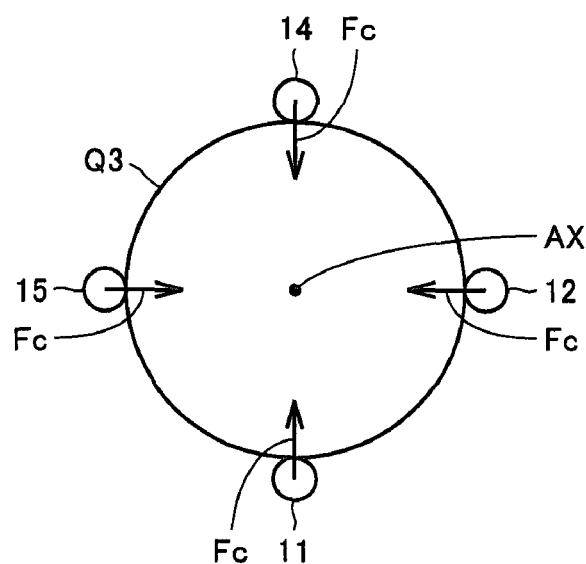
FIG. 32 is an explanatory view schematically showing a state of a force applied to an electrode lead in the method for manufacturing a solid electrolytic capacitor in Embodiment 3 of the present invention.

Referring mainly to FIG. 32, in the example, since winding core 33 has the outer edge in the shape of circle Q3, a force is likely to be applied evenly to entire anode foil 3 and cathode foil 4. As a result, occurrence of force Ft (FIG. 14) to be applied to lead tab terminals 11, 12, 14, and 15 is suppressed, and this is considered as a reason for improved accuracy of the arrangement of the lead tab terminals when compared with that in the comparative example.

Figure 33:
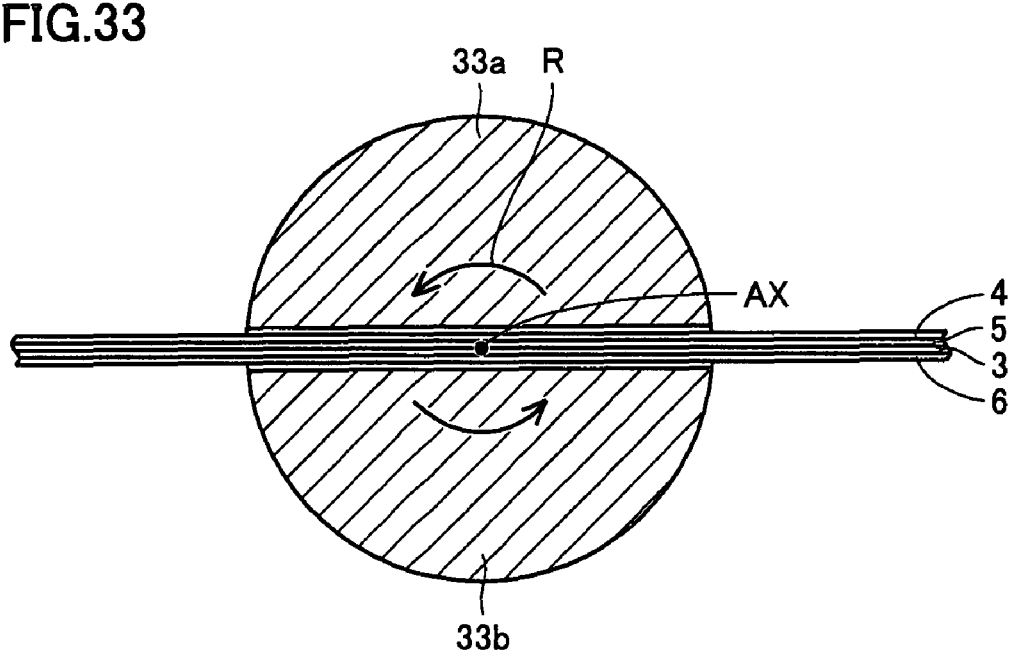
FIG. 33 is a cross sectional view schematically showing one step of a method for manufacturing a solid electrolytic capacitor in a variation of Embodiment 3 of the present invention.

Although one end portions of anode foil 3, cathode foil 4, and separator sheets 5, 6 are tucked into slit SL as shown in FIG. 31 in the present embodiment, middle portions of anode foil 3, cathode foil 4, and separator sheets 5, 6 may be tucked into slit SL as shown in FIG. 33. In this case, winding is started at each of both ends of slit SL.

Embodiment 4

In the present embodiment, electrolytic capacitor 1 of a three-terminal structure (FIGS. 17, 18) described in Embodiment 2 is manufactured using winding core 33 (FIGS. 29, 30) described in Embodiment 3.

According to the method for manufacturing a solid electrolytic capacitor of the present embodiment, accuracy of the arrangement of three lead tab terminals 11 to 13 (FIG. 19) can be improved. In order to verify the effect, accuracy of the positions of the lead terminals was compared and examined between an example using winding core 33 having the circular outer edge and the comparative example using winding core 39 (FIG. 12) having the outer edge of track shape Q9 (FIG. 13). Specifically, 300 solid electrolytic capacitors were manufactured, and checked as to whether or not they satisfied a standard that angle T2 of triangle P2 (FIG. 19) having apexes located at the positions of lead tab terminals 11 to 13 has an angle of 60°±20°. As a result, 10 of the 300 solid electrolytic capacitors of the example were out of the standard, although all of the 300 solid electrolytic capacitors of the comparative example were out of the standard. Namely, accuracy of the arrangement of the lead tab terminals in the example was higher than that in the comparative example.

Figure 34:
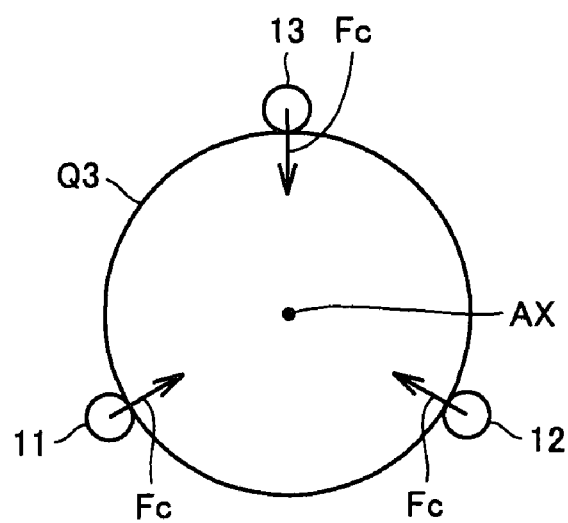
FIG. 34 is an explanatory view schematically showing a state of a force applied to an electrode lead in a method for manufacturing a solid electrolytic capacitor in Embodiment 4 of the present invention.

Referring mainly to FIG. 34, in the example, since winding core 33 has the outer edge in the shape of circle Q3, a force is likely to be applied evenly to entire anode foil 3 and cathode foil 4. As a result, occurrence of force Ft (FIG. 14) to be applied to the lead tab terminals is suppressed, and this is considered as a reason for improved accuracy of the arrangement of lead tab terminals 11 to 13 when compared with that in the comparative example.

Although one end portions of anode foil 3, cathode foil 4, and separator sheets 5, 6 are tucked into slit SL as shown in FIG. 31 in the present embodiment, middle portions of anode foil 3, cathode foil 4, and separator sheets 5, 6 may be tucked into slit SL as shown in FIG. 33. In this case, winding is started at each of both ends of slit SL.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A method for manufacturing an electrolytic capacitor, comprising the steps of:
   preparing a cathode foil and an anode foil;
   attaching electrode lead terminals in a number not less than three to said cathode foil and said anode foil, said electrode lead terminals including at least one cathode lead terminal attached to said cathode foil and at least one anode lead terminal attached to said anode foil;
   preparing a winding core having an axis;
   winding said cathode foil and said anode foil around said winding core, with said cathode foil and said anode foil overlapped each other, and
   removing said winding core after said step of winding,
   a cross section of said winding core perpendicular to said axis including an outer edge having a portion along each side of a polygon with said number of sides,
   said step of winding including the step of arranging the electrode lead terminals in said number on said number of sides of said polygon, respectively.

2. The method for manufacturing an electrolytic capacitor according to claim 1, wherein said number is three.

3. The method for manufacturing an electrolytic capacitor according to claim 1, wherein said number is four.

4. The method for manufacturing an electrolytic capacitor according to claim 1, wherein said winding core has a chamfered corner portion.

5. The method for manufacturing an electrolytic capacitor according to claim 1, wherein one end portion of said winding core in a direction of said axis is divided by a slit into first and second portions.

* * * * *